Aug. 19, 1947.   E. O. HERMANN   2,425,875
CARGO BRACE
Filed April 15, 1946   2 Sheets—Sheet 1

INVENTOR.
Edward O. Hermann
BY William F. Booth Jr.
Atty.

Aug. 19, 1947.   E. O. HERMANN   2,425,875
CARGO BRACE
Filed April 15, 1946   2 Sheets-Sheet 2
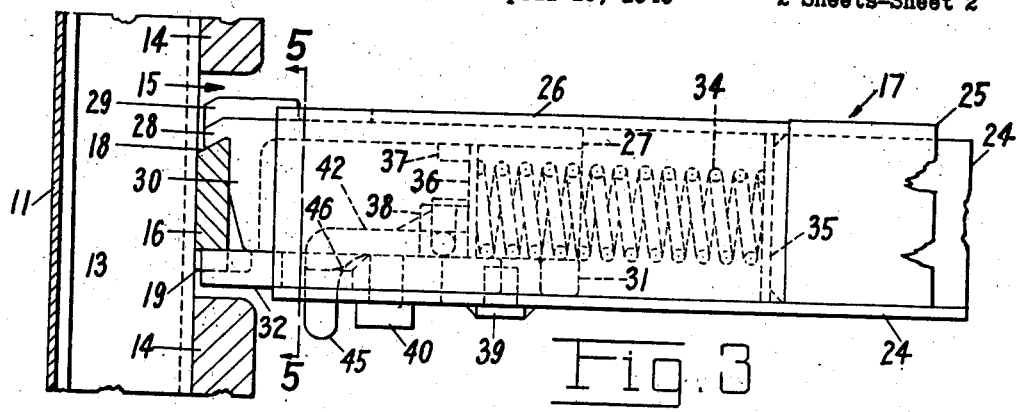
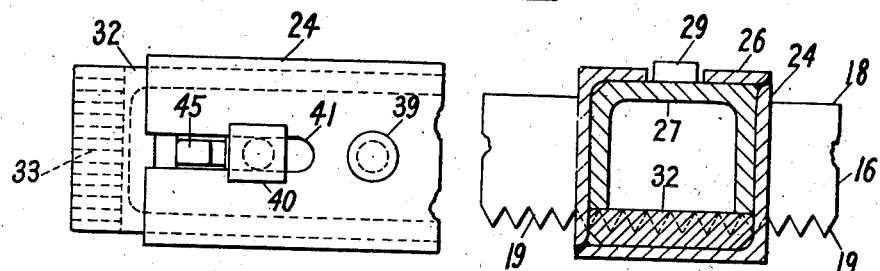
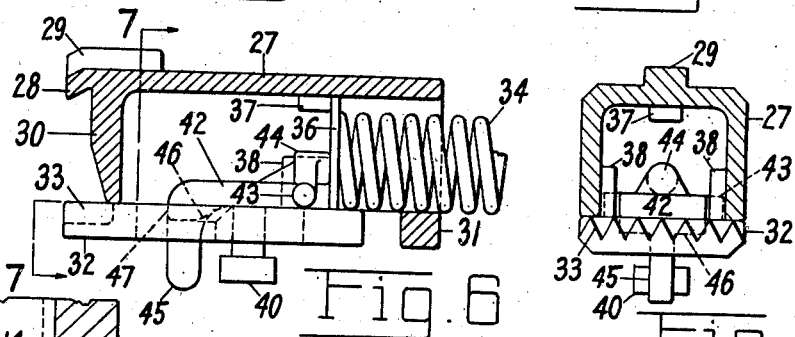
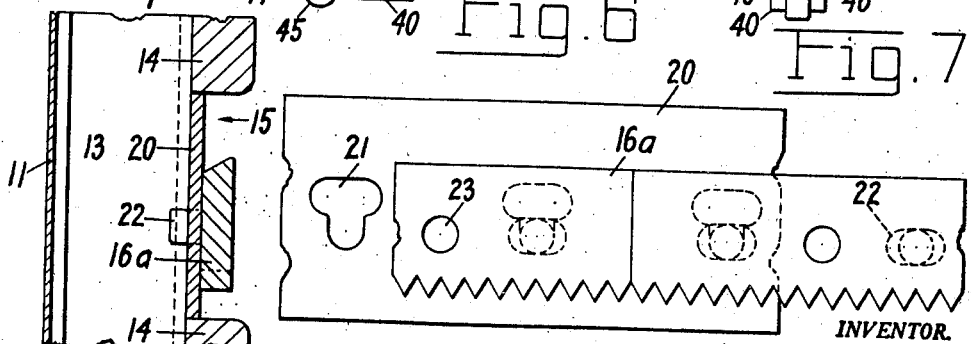
INVENTOR.
Edward O. Hermann
BY
Attp.

Patented Aug. 19, 1947

2,425,875

UNITED STATES PATENT OFFICE 2,425,875

CARGO BRACE

Edward O. Hermann, Mill Valley, Calif.

Application April 15, 1946, Serial No. 662,185

14 Claims. (Cl. 105—369)

1

The present invention relates to bracing means for the lading of freight vehicles, for example railway box cars or van type highway trucks, and constitutes an improvement upon the apparatus disclosed and claimed in my United States Patent 2,354,861, issued August 1, 1944.

The principal object of the present invention is to provide removable and adjustable bracing means in the form of a plurality of independent bars extending transversely across the interior of the vehicle, which are capable of being moved to any position in the length of the vehicle and to several different positions in the height thereof, and which can be quickly and easily locked in such positions.

Two or more of my improved brace bars, when arranged in the same horizontal plane, can be used to support a removable platform or deck between the floor of the vehicle and the roof. One or more of the improved bars, when arranged in the same vertical plane, can be used to brace the lading against endwise shifting in the vehicle.

Another object of the invention is to provide a transverse bar brace, which can be slid lengthwise of the vehicle in suitable tracks mounted in the side walls thereof and pushed up into tight contact with the lading and locked in such tight contact without requiring a further adjusting operation to maintain close contact with the lading.

Other objects are to provide tracks of improved form along which the braces may slide into final position; to provide for the automatic adjustment of the length of each bar brace in order to compensate for variations or irregularities in the width of the vehicle; and to provide a bracing structure which is simple and economical to install and use.

Further objects and advantages of the invention will be apparent from the following description, which should be read with the understanding that changes, within the scope of the claims hereto appended, may be made in the form, construction and arrangement of the several parts herein shown and described, without departing from the spirit of the invention.

The accompanying drawings illustrate a preferred embodiment of the invention and a modification of one portion thereof.

2

Fig. 3 is an enlarged view of a portion of the side wall of the vehicle shown in section, and the end portion of one of my improved bar braces shown in elevation.

Fig. 4 is a bottom view of one end portion of the bar brace.

Fig. 5 is a transverse section on the line 5—5 of Fig. 3.

Fig. 6 is a longitudinal view partly in elevation and partly in section of the supporting and locking mechanism of the bar brace.

Fig. 7 is a part sectional end elevation of the parts shown in Fig. 6, taken on the line 7—7 thereof, and Figs. 8 and 9 are respectively a section and an elevation of a modified form of track for supporting my improved bar brace.

Figure 1:
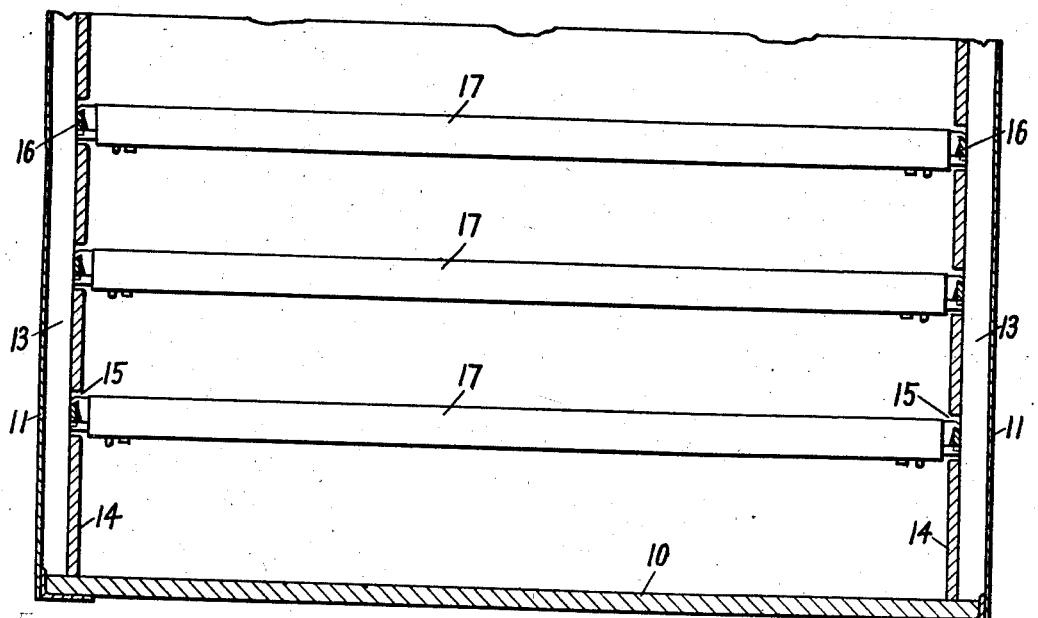
Fig. 1 is a transverse section of a portion of a freight vehicle showing three of my improved bar braces therein.

In the drawings, the reference numeral 10 (Figs. 1 and 2) designates the floor of a freight vehicle, 11 are the side walls thereof, and 12 is an end wall. The walls are provided with vertical frame members 13, and with an interior lining 14, usually wood. The lining of the side walls is formed with horizontal open spaces 15, in which are mounted tracks 16 upon which the braces 17 can slide lengthwise of the vehicle. Each brace is in the form of a single bar extending across the entire width of the vehicle. A number of the bar braces may be mounted in the same horizontal plane on the same pair of rails 16, as shown in the upper portion of Fig. 2, and planks, not shown, may be laid thereupon to form an upper deck in the vehicle; or one or more of the bar braces may be arranged in the same vertical plane, as shown in Fig. 1 and at the right in Fig. 2, to form a transverse bulkhead across the vehicle. Other arrangements of the bars to accommodate lading of various types and shapes will suggest themselves to those skilled in the art.

My improved track 16 for supporting the ends of the bar braces is formed of a strap of flat steel secured to the upright frame members 13 on the vehicle wall, and having a smooth upper edge 18 and a serrated lower edge 19. The thickness of the track strip 16 is less than that of the wall lining 14, so that the edges of the track will not come in contact with the lading. The upper smooth edge 18 of the track is undercut preferably by being formed on a slope downwardly toward the supporting members 13, as shown in Fig. 3, although any other shape of undercut may be used. Both the upper and the lower edges of the track 16 are spaced from the edges of the adjacent wall lining 14, as shown in Fig. 3.

A modified construction of the track is shown in Figs. 8 and 9. A steel plate or strip 20 of sufficient width to completely fill the space 15 between the wall lining members 14 is secured to the wall frame members 13, and the track 16a, which has the same shape as the track 16 of Fig. 3, is removably secured to the permanently mounted strip 20 by means of keyhole slots 21 in the strip 20 and T-headed lugs 22 projecting from the back of the track 16a. In this form of track, the member 16a may be formed in short lengths as shown in Fig. 9 for convenience in manufacture and assembly. Holes 23 are drilled through the track members 16a and the supporting strip 20, and bolts or screws, not shown, may extend through said holes and be secured to the vertical frame members of the wall. The objects of this modification of the track are to provide complete closure for the space 15 between the wall lining members 14 and to enable the track itself to be made in short lengths.

Figure 2:
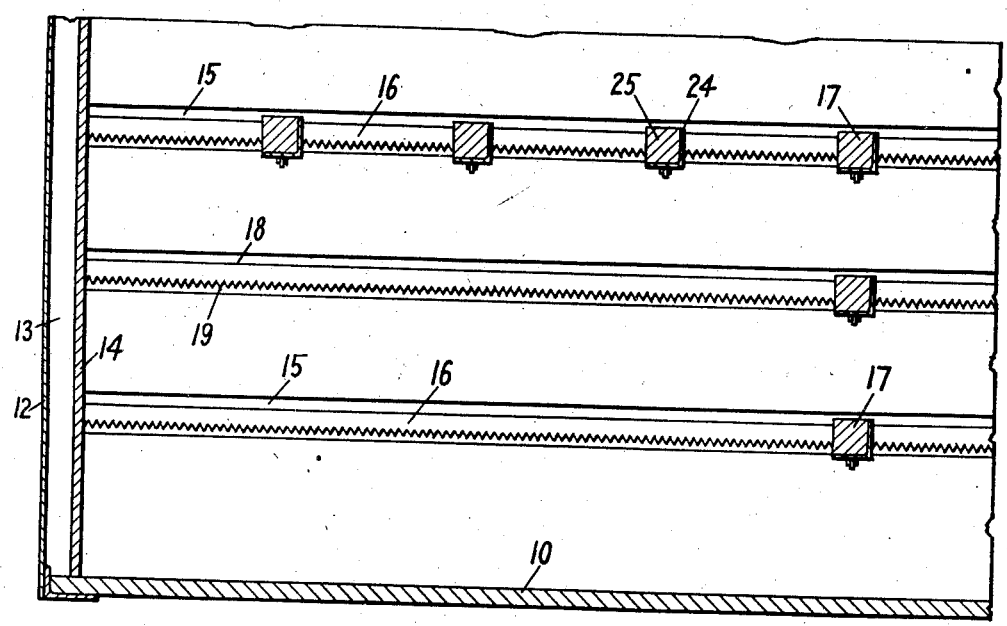
Fig. 2 is a longitudinal section of a portion of a freight vehicle showing a number of my improved bar braces positioned in both horizontal and vertical bracing arrangements.

My improved bar brace is preferably formed of a steel angle member 24 and a rectangular wood filler 25, as shown in Figs. 2 and 3. The wood filler 25 terminates some six or eight inches short of the ends of the steel angle member 24, and a short angle member 26 is welded to the projecting end of the angle member 24 to form a rectangular box structure, as shown in section in Fig. 5.

A supporting slide member 27 is mounted within the box formed by the angle members 24 and 26 and has sufficient freedom therein to slide endwise. At its outer end, the slide member 27 has a hook 28 which rests upon and fits over the undercut top of the track 16. The hook 28 extends the full width of the slide member 27, and is provided with a reinforcing rib 29 at its center, said rib operating in a slot in the top of the box member 26. Immediately back of the hook 28, the slide member 27 is provided with a vertical abutment 30, Figs. 3 and 6, which is in contact with the vertical face of the track 16. The inner or rear end of the slide member 27 is formed as a hollow square which fits closely, but has free sliding movement, in the box 24—26. For the greater part of its length, however, the bottom 31 of the slide 27 is cut away, and the space left thereby is filled by an independently slidable flat locking plate 32.

The outer end of the locking plate 32 is provided with teeth 33 on its upper surface to engage the teeth 19 formed on the bottom of the track. The height of the vertical abutment 30 is such that its lower edge forms a guide against which the locking plate 32 operates. The hook 28 and the toothed end of the locking plate 32 are prevented from spreading apart vertically by the top and bottom of the box 24—26 within which they lie, so that the end of the bar brace cannot be pulled away from the track. A spring 34 operates to push the slide member 27 and the locking plate 32 outwardly. The spring 34 operates between a rear plate 35 fixed within the box 24—26, and a forward plate 36 mounted loosely within the slide member 27, and bearing against lugs 37 and 38 formed therein. A pin 39 fixed in the bottom of the box member 24—26 projects into the space between the rear end of the locking plate 32 and the rear portion of the bottom 31 of the slide 27 and serves to limit the outward motion of said slide. The slide, therefore, is a unitary part of the end of the bar brace, and has limited movement therein resisted by the spring 34.

The locking plate 32, as stated above, has sliding movement independently of the movement of the slide 27, in order to enable it to be withdrawn sufficiently to disengage its teeth 33 from the teeth of the track. A knob 40 is secured to said locking plate 32 and extends downwardly through a slot 41 in the bottom of the box 24—26. A latch lever 42 is provided to hold the locking plate 32 in its extended or locking position and to release it so that it can be withdrawn by the knob 40 to free the teeth of the track. The latch lever 42 has horizontally disposed pivots 43 mounted in recesses of lugs 38 inside the slide 27, as shown in Figs. 6 and 7. A head portion 44 projects upwardly from the pivot portion of the latch lever 42 and engages the end plate 36 of the spring, whereby the horizontal portion of said latch lever is held down against the surface of the locking plate 32 in the position shown.

The latch lever 42 has a vertical portion at its forward end which extends downwardly through an opening in the locking plate 32 and through the slot 41 in the box 24—26, and ends in a thumb piece 45. The latch lever 42 has shoulders 46 on either side of the vertical depending thumb piece portion, which shoulders lie in recesses in the locking plate 32 and engage the front edge 47 thereof to lock said plate 32 against retracting movement when the latch 42 is in its lowermost position, as shown. When said latch is raised by pressing upwardly on the thumb piece 45, the shoulders 46 are elevated clear of the edge 47 of said recess, allowing the locking plate 32 to be retracted. Both ends of each bar are preferably provided with the mechanism described above for engaging the tracks.

The brace bar is mounted in the vehicle by placing it between a pair of opposite tracks and bringing it to a transverse position with the hooks 28 of the slides 27 engaging and resting upon the tops of the tracks. The bars are then slid along the tracks into contact with the lading which is to be braced. During the assembling and sliding into position of the bar, the locking plates 32 are retracted. When the bar reaches its final position, the locking plates are moved outwardly into engagement with the teeth of the tracks, thereby locking the ends of the bar securely in position. The teeth of the tracks and the locking plates are sufficiently small and close together so that the bar can be pushed into close contact with the lading and locked there without requiring any further adjustment.

The retracting movement of the slides 27, resisted by the springs 34, provides compensation in the length of the bar for normal irregularities in the width of the vehicle so that the ends of the bar have no tendency to pull away from the tracks either during the movement of the bar to its final position or after it has been locked therein.

I claim:

1. Cargo bracing means for freight vehicles comprising parallel tracks mounted on opposite walls of the vehicle, a brace in the form of a bar extending across the vehicle between said tracks and mounted slidably thereon, track engaging members at the ends of said brace, at least one of said members being movable endwise of the brace to compensate for irregularities in the distance between said tracks, a spring resiliently connecting said movable member with the brace to resist said endwise movement, and means on the brace engageable with the tracks to lock said brace against sliding movement along said tracks.

2. Cargo bracing means for freight vehicles comprising parallel tracks mounted on opposite walls of the vehicle, a brace in the form of a bar extending across the vehicle between said tracks, track engaging members at the ends of said brace, said members being slidable on said tracks and formed to hook over the edges thereof, at least one of said members being movable endwise of the brace to compensate for irregularities in the distance between said tracks, a spring resiliently connecting said movable member with the brace to resist said endwise movement, and means at the ends of the brace engageable with the tracks to lock said brace against sliding movement along said track.

3. Cargo bracing means for freight vehicles comprising parallel tracks mounted on opposite walls of the vehicle, each track comprising a flat strip having an undercut upper edge, a brace in the form of a bar extending across the vehicle between said tracks, track engaging members at the ends of said braces, said members being slidable on said tracks and formed to hook over the undercut upper edges thereof, at least one of said members being movable endwise of the brace to compensate for irregularities in the distance between said tracks, a spring resiliently connecting said movable member with the brace to resist said endwise movement, and means at the ends of the brace engageable with the tracks to lock said brace against sliding movement along said tracks.

4. Cargo bracing means for freight vehicles comprising parallel tracks mounted on opposite walls of the vehicle, each track comprising a strip having an undercut upper edge and a flat outer face, a brace in the form of a bar extending across the vehicle between said tracks, track engaging members at the ends of said braces, each of said members having a hook formed to engage and slide along the undercut upper edge of said track, and a flat surface below said hook formed to abut against and slide upon the outer face of said track, at least one of said members being movable endwise of the brace to compensate for irregularities in the distance between said tracks, a spring resiliently connecting said movable member with the brace to resist said endwise movement, and means at the ends of the brace engageable with the tracks to lock said brace against sliding movement along said track.

5. Cargo bracing means for freight vehicles comprising parallel tracks mounted on opposite walls of the vehicle, a brace in the form of a bar extending across the vehicle between said tracks and mounted slidably thereon, said brace having a hollow portion rectangular in cross section at one end, track engaging members at the ends of said brace, one of said members being mounted for endwise movement in said hollow portion, a spring within said hollow portion behind said movable member to force it outwardly, means for limiting said outward movement, and means at the ends of the brace engageable with the tracks to lock said brace against sliding movement along said tracks.

6. Cargo bracing means for freight vehicles comprising parallel tracks mounted on opposite walls of the vehicle, a brace in the form of a bar extending across the vehicle between said tracks and mounted slidably thereon, said brace having a hollow portion rectangular in cross section at one end, track engaging members at the ends of said brace, one of said members being mounted for endwise movement in said hollow portion, a spring within said hollow portion behind said movable member to force it outwardly, a locking member mounted in said hollow portion and movable endwise independently of said track engaging member, said locking member being engageable with the track to lock the brace against sliding movement thereon.

7. Cargo bracing means for freight vehicles comprising parallel tracks mounted on opposite walls of the vehicle, a brace in the form of a bar extending across the vehicle between said tracks and mounted slidably thereon, said brace having a hollow portion rectangular in cross section at one end, track engaging members at the ends of said brace, one of said members being mounted for endwise movement in said hollow portion, a spring within said hollow portion behind said movable member to force it outwardly, a locking member mounted in said hollow portion and movable endwise independently of said track engaging member, said locking member being engageable with the track to lock the brace against sliding movement thereon, and a movable latch for holding said locking member in track engaging position, said latch being moved in one direction by said spring.

8. Cargo bracing means for freight vehicles comprising parallel tracks mounted on opposite walls of the vehicle, each track having a smooth upper edge and a toothed lower edge, a brace in the form of a bar extending across the vehicle between said tracks, track engaging members at the ends of said braces, each of said members having a hook formed to engage and slide along the smooth upper edge of the track, at least one of said members being movable endwise of the brace, a spring between said movable member and the brace to resist said endwise movement, and locking members movable in the ends of the brace independently of said track engaging members, said locking members being formed to engage the toothed lower edges of the tracks.

9. Cargo bracing means for freight vehicles comprising parallel tracks mounted on opposite walls of the vehicle, each track having a smooth upper edge and a toothed lower edge, a brace in the form of a bar extending across the vehicle between said tracks, track engaging members at the ends of said braces, each of said members having a hook formed to engage and slide along the smooth upper edge of the track, at least one of said members being movable endwise of the brace, and locking members movable endwise in the end portions of the brace independently of said track engaging members, said locking members being positioned to extend beneath the tracks and having teeth on their upper surfaces formed to engage the toothed lower edges of said tracks, whereby said hooked members are locked against sliding movement along and separating movement away from said tracks.

10. Cargo bracing means for freight vehicles comprising parallel tracks mounted on opposite walls of the vehicle, a brace in the form of a bar extending across the vehicle between said tracks and mounted slidably thereon, said brace having hollow rectangular portions at its ends, track engaging members mounted for sliding endwise movement in said hollow brace portions, said track engaging members having hooks formed to hook over and slide upon the upper surfaces of said tracks, and locking members movable endwise in said hollow brace portions below said track engaging members, said locking members being positioned to extend beneath and engage the lower edges of the tracks, whereby to lock said hook members against sliding movement along and separating movement away from said tracks.

11. Cargo bracing means for freight vehicles comprising parallel tracks mounted on opposite walls of the vehicle, each track having a smooth upper edge and a toothed lower edge, a brace in the form of a bar extending across the vehicle between said tracks, track engaging members at the ends of said braces, each of said members having a hook formed to engage and slide along the smooth upper edge of the track, at least one of said members being movable endwise of the brace, a spring between said movable member and the brace to resist said endwise movement, locking members movable in the ends of the brace independently of said track engaging members, said locking members being formed to engage the toothed lower edges of the tracks, and movable latch members cooperating with said locking members to hold them in engagement with the teeth of the tracks.

12. Cargo bracing means for freight vehicles having opposite side walls formed with frame members and interior lining members secured thereto, said lining members being separated to form a long narrow horizontal space in the lining of each wall, tracks mounted in said spaces, each track comprising a metal inner strip fixed to the wall frame members and having a width equal to the width of the space in the lining whereby said spaces are closed, a metal outer strip of less width than the inner strip secured to the exposed face thereof, a brace in the form of a bar extending across the vehicle, said brace having end members engaging and sliding upon the outer strip, and locking means at the ends of the brace engageable with said track to lock said brace against sliding movement thereon.

13. Cargo bracing means for freight vehicles having opposite side walls formed with frame members and interior lining members secured thereto, said lining members being separated to form a long narrow horizontal space in the lining of each wall, tracks mounted in said spaces, each track comprising a metal inner strip fixed to the wall frame members and having a width equal to the width of the space in the lining whereby said spaces are closed, a series of segments placed end to end and removably secured to the exposed face of said inner strip to form a continuous outer strip of less width than said inner strip, a brace in the form of a bar extending across the vehicle, said brace having end members engaging and sliding upon the outer strip, and locking means at the ends of the brace engageable with said track to lock said brace against sliding movement thereon.

14. Cargo bracing means for freight vehicles having opposite side walls formed with frame members and interior lining members secured thereto, said lining members being separated to form a long narrow horizontal space in the lining of each wall, tracks mounted in said spaces, each track comprising a metal inner strip fixed to the wall frame members and having a width equal to the width of the space in the lining whereby said spaces are closed, a metal outer strip of less width than the inner strip secured to the exposed face thereof, said outer strip having an undercut upper edge and a toothed lower edge, a brace in the form of a bar extending across the vehicle, said brace having end members formed to hook over and slide upon the undercut upper edges of said outer track strip, and movable locking means at the ends of said brace formed to engage the teeth of said outer track strip to lock said brace against sliding movement along said track.

EDWARD O. HERMANN.